(12) United States Patent
Hurley et al.

(10) Patent No.: US 12,169,489 B2
(45) Date of Patent: Dec. 17, 2024

(54) DEVICES, SYSTEMS, AND METHODS FOR ACCELERATING CHARACTER MATCHING

(71) Applicant: MELLANOX TECHNOLOGIES, LTD., Yokneam (IL)

(72) Inventors: John Hurley, Belfast (IE); Antonio Munoz Ortega, Stralsund (DE); Gareth Richard Douglas, Antrim (IE)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 388 days.

(21) Appl. No.: 17/583,536

(22) Filed: Jan. 25, 2022

(65) Prior Publication Data
US 2023/0297566 A1 Sep. 21, 2023

(51) Int. Cl.
| | |
|---|---|
| G06F 16/20 | (2019.01) |
| G06F 16/242 | (2019.01) |
| G06F 16/2457 | (2019.01) |
| G06F 16/38 | (2019.01) |
| G06F 40/126 | (2020.01) |

(52) U.S. Cl.
CPC ...... *G06F 16/243* (2019.01); *G06F 16/24573* (2019.01); *G06F 16/38* (2019.01); *G06F 40/126* (2020.01)

(58) Field of Classification Search
CPC .. G06F 16/243; G06F 16/24573; G06F 16/38; G06F 40/126
See application file for complete search history.

(56) References Cited

U.S. PATENT DOCUMENTS

| | | | |
|---|---|---|---|
| 9,697,226 B1* | 7/2017 | Youngworth | G06F 3/0655 |
| 2010/0076919 A1* | 3/2010 | Chen | H04L 12/56 |
| | | | 706/46 |
| 2010/0174718 A1* | 7/2010 | Chen | G06F 16/31 |
| | | | 707/E17.014 |
| 2014/0244650 A1* | 8/2014 | Zhou | G06F 16/285 |
| | | | 707/737 |
| 2015/0081353 A1* | 3/2015 | Schuster | G06Q 10/063 |
| | | | 705/7.11 |
| 2016/0350551 A1* | 12/2016 | Chang | G06F 3/064 |

* cited by examiner

*Primary Examiner* — Mahesh H Dwivedi
(74) *Attorney, Agent, or Firm* — Sheridan Ross P.C.

(57) ABSTRACT

A network device comprises processing circuitry configured to: receive a plurality of data chunks from at least one source; form a composite data chunk from at least first and second data chunks of the plurality of data chunks; process the composite data chunk to identify a match between a first pattern of characters within the composite data chunk and a stored pattern of characters; and validate or invalidate the match based on metadata of the composite data chunk.

20 Claims, 3 Drawing Sheets

DEVICES, SYSTEMS, AND METHODS FOR ACCELERATING CHARACTER MATCHING

FIELD OF THE DISCLOSURE

The present disclosure is generally directed to systems, devices, and methods for accelerating character matching, for example, regular expression (regex) matching.

BACKGROUND

In networking and data center applications, character matching, such as regular expression matching, is a component of functions including, but not limited to, Intrusion Detection/Prevention Systems (IDP/IPS), Web Application Firewalls (WAF), Deep Packet Inspection (DPI), and Application Recognition. Aside from such functions that operate at packet/stream level, regex pattern matching is a main cost in processor intensive tasks like malware detection and DNA sequence profiling.

BRIEF SUMMARY

In an illustrative embodiment, a network device comprises processing circuitry configured to: receive a plurality of data chunks from at least one source; form a composite data chunk from at least first and second data chunks of the plurality of data chunks; process the composite data chunk to identify a match between a first pattern of characters within the composite data chunk and a stored pattern of characters; and validate or invalidate the match based on metadata of the composite data chunk.

In another illustrative embodiment, a system comprises at least one network device that runs one or more applications; and processing circuitry coupled to the at least one network device and configured to: receive a plurality of data chunks from the one or more applications; form a composite data chunk from at least first and second data chunks of the plurality of data chunks; process the composite data chunk to identify a match between a first pattern of characters within the composite data chunk and a stored pattern of characters, the stored pattern of characters corresponding to a regular expression; validate or invalidate the match based on metadata of the composite data chunk; generate output that informs the one or more applications of the match when the match is validated; and discard the match when the match is invalidated.

In another illustrative embodiment, a network device comprises a first processing block configured to form a composite data chunk from a plurality of data chunks and assign metadata to the composite data chunk based on configuration information associated with the plurality of data chunks; and a second processing block that is isolated from the configuration information and the metadata, the second processing block being configured to process the composite data chunk to identify a match between a first pattern of characters within the composite data chunk and a stored pattern of characters.

Additional features and advantages are described herein and will be apparent from the following Description and the figures.

BRIEF DESCRIPTION OF THE DRAWINGS

The present disclosure is described in conjunction with the appended figures, which are not necessarily drawn to scale.

DETAILED DESCRIPTION

Figure 1:
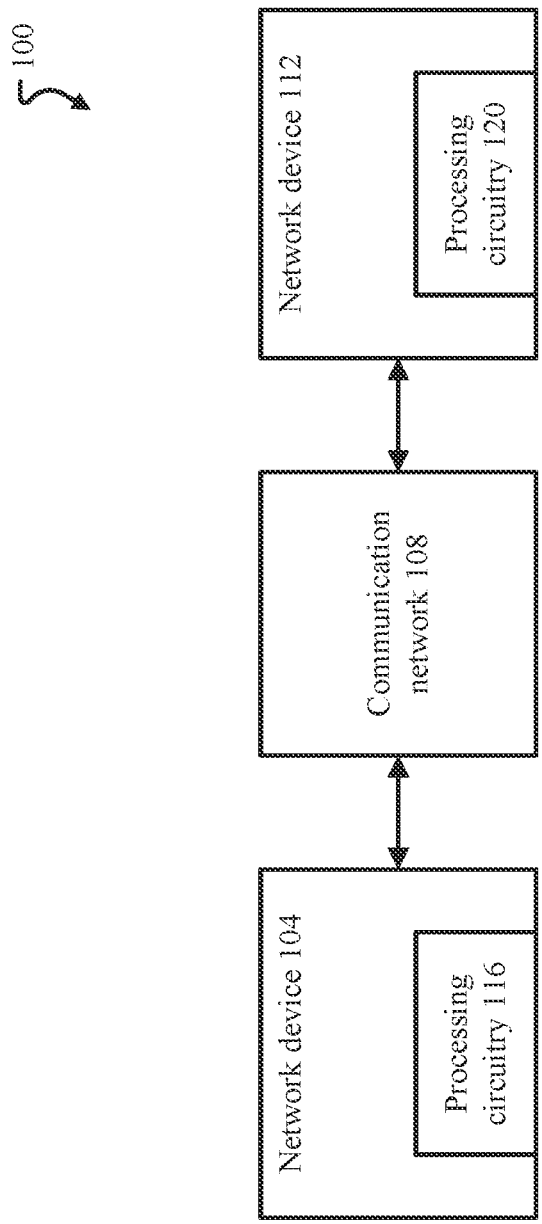
FIG. 1 illustrates a block diagram of a system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The demand to improve the performance of complex pattern matching (or string matching) without burning extra power and compute resources continues to grow. One known problem within the field relates to the fact that throughput starts to reduce when the analyzed data chunks (also known as jobs) become small. In such cases, the overheads of PCIe writes and hardware queuing become the bottleneck, rather than the regex processing engine. Inventive concepts relate to off-loading regex matching from host processing resources to a look aside accelerator that batches smaller data chunks into a larger data chunk on which regex matching is performed. The returned matches are then validated or invalidated in post-processing operations.

In general, offloading regex processing offers customers advantages both in terms of performance and the release of CPU resources. For example, a customer may want to utilize regex to implement Access Control List (ACL) lookups, which typically requires processing relatively small jobs (e.g., under 20 bytes). Given that offload operations perform better with jobs greater than 1000 bytes, the benefits of offloading these relatively small jobs for processing are reduced. Thus, inventive concepts relate to improving performance for these small jobs by batching a group of small jobs into a single large job for regex matching.

In at least one embodiment, a regular expression processor (also referred to as RXP processor) may be embedded within a data processing unit (DPU) as a look aside accelerator. The software developer kit (SDK) for the DPU may include an application program interface (API) with a rules compiler (e.g., a RXPC complier) that coverts regular expressions to machine code instructions utilized by the accelerator. The SDK may also include a benchmarking tool (e.g., RXPBench) which can run on an x86 host processor or ARM cores of the DPU card to provide performance profiling of regex rulesets against multiple data inputs. In one example, the provided SDK is based on the open source data plane development kit (DPDK). Other reference applications may be built on top of the open source DPDK framework for interaction with the DPU card and RXP processor.

The DPDK API used in applications such as RXPBench is well defined and should not be modified without justification and community backing. Similarly, it is not feasible to change the processing of the DPU card on an ad hoc basis. Therefore, inventive concepts propose to improve the performance of regex processing for small jobs by modifying the underlying DPDK driver implementation in cooperation with the rules compiler (RXPC compiler). In one example, the compiler uses knowledge of the batching performed by the DPDK driver to assist with the matching process, for example, in the case of a regex that is anchored.

In one example, a DPDK mlx5 regex driver receives a 'batch' of regex_ops or data chunks to process. Normally, each data chunk would be sent to the accelerator separately for regex matching. However, inventive concepts propose to modify to the driver (see FIGS. 2A and 2B) and to utilize the scatter-gather memory capabilities of the DPU to send several smaller data chunks as one large data chunk to the accelerator for regex matching. The scatter-gather memory capabilities of the DPU are utilized in that the data chunks are gathered from multiple non-contiguous memory locations as if the data chunks were stored contiguously at a single memory location. Therefore, from the accelerator's perspective, only a single large job is processed. Batching several smaller data chunks into one larger data chunk may also include generating and storing metadata that that identifies where each smaller data chunk is located within the large data chunk.

When a response for this single job is dequeued by the driver, stored metadata is retrieved, and any results are distributed according to the initial small job/regex_op format (see FIG. 2). In addition, modifications are made to the rules compiler (e.g., encoding anchor information in rule IDs of regular expressions) so that when combined with the metadata, the system can ensure that the matches returned are valid. In other words, the driver and compiler modifications are used to ensure that "anchored" regular expressions are properly detected and that matches which span over multiple jobs are ignored.

Experiments run with RXPBench show positive results with the DPDK driver/RXPC modifications. One such experiment offloaded 64 byte jobs of network traffic data from an x86 host for comparison against a set of open source, web browser-based, regular expressions. The system achieved a rate of 4.75 million jobs per second (Mjps) without the aforementioned driver modification, which increased to 16.98 Mjps with the proposed changes to the driver and rules compiler (a 3.57× improvement). With RXPBench running on an ARM core, a test of 32k ACL strings (each 16 bytes long with wildcarded fields) produced a rate of 3.23 Mjps without the modifications and 8.2 Mjps with the modifications (a 2.54× improvement). As may be appreciated, a significant performance increase is achieved when modifying accessible code to enable batching small jobs into a singular large job and using software side pre/post processing to validate and invalidate matches found in the large job.

FIG. 1 illustrates a system 100 according to at least one example embodiment. The system 100 includes a network device 104, a communication network 108, and a network device 112. In at least one example embodiment, network devices 104 and 112 may correspond a network switch (e.g., an Ethernet switch), a collection of network switches, a network interface controller (NIC), a data processing unit (DPU), or any other suitable device used to control the flow of data between devices connected to communication network 108. Each network device 104 and 112 may be connected to one or more of Personal Computer (PC), a laptop, a tablet, a smartphone, a server, a collection of servers, or the like. In one specific, but non-limiting example, each network device 104 and 112 includes multiple network switches in a fixed configuration or in a modular configuration.

Examples of the communication network 108 that may be used to connect the network devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables communication between the network devices 104 and 112 using Ethernet technology. In one specific, but non-limiting example, the network devices 104 and 112 correspond to director switches that may have a modular configuration. As discussed in more detail below, a network switch (e.g., a director switch) according to inventive concepts may implement multiple blocks of a network topology as field replaceable units (FRUs) or customer replaceable units (CRUs) within a single chassis.

The network device 104 and/or the network device 112 may include storage devices and/or processing circuitry for carrying out computing tasks, for example, tasks associated with controlling the flow of data within each network device 104 and 112 and/or over the communication network 108. For example, the network device 104 includes processing circuitry 116 while network device 112 includes processing circuitry 120. Such processing circuitry 116 and 120 may comprise software, hardware, or a combination thereof. For example, the processing circuitries 116 and 120 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitries 116 and 120 may comprise hardware, such as an application specific integrated circuit (ASIC). Other non-limiting examples of the processing circuitries 116 and 120 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, and/or the like. Some or all of the processing circuitry 116 and 120 may be provided on a Printed Circuit Board (PCB) or collection of PCBs. It should be appreciated that any appropriate type of electrical component or collection of electrical components may be suitable for inclusion in the processing circuitry. In one non-limiting example, the network devices 104 and 112 are servers and/or network switches included in a datacenter while each processing circuitry 116 and 120 is included in or comprises hardware and/or software for a data processing unit (DPU) that accelerates certain tasks offloaded from a respective network device 104 and 112. For example, the processing circuitry 116 and/or 120 may run one or more applications for regex matching on behalf of one or more other applications running on the network devices 104 and/or 112. Regex matching may be useful for Intrusion Detection/Prevention Systems, Web Application Firewalls, Deep Packet Inspection, Application Recognition, malware detection, DNA sequence profile, access control list lookups, and/or the like.

In addition, although not explicitly shown, it should be appreciated that the network devices 104 and 112 include one or more communication interfaces for facilitating wired and/or wireless communication between one another and other unillustrated elements of the system 100.

Figure 2A:
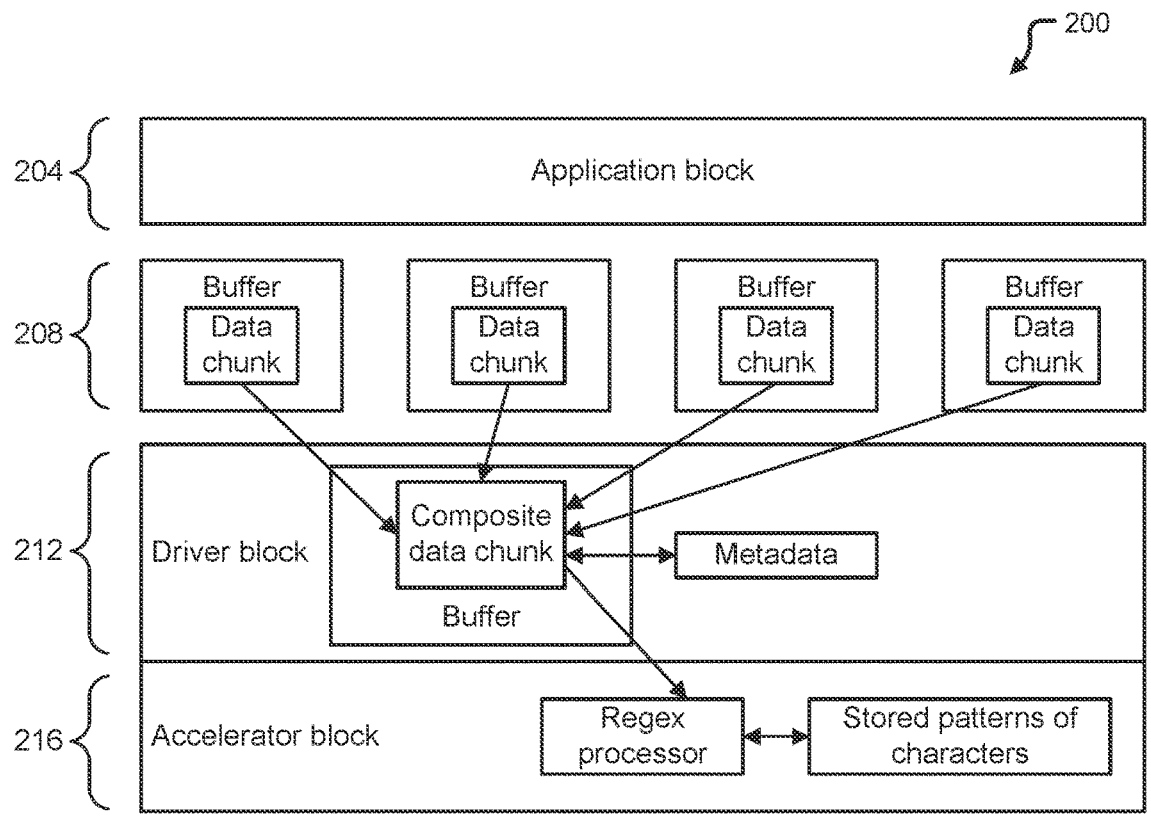
FIGS. 2A and 2B illustrate block diagrams of processing circuitry according to at least one example embodiment.
Figure 2B:
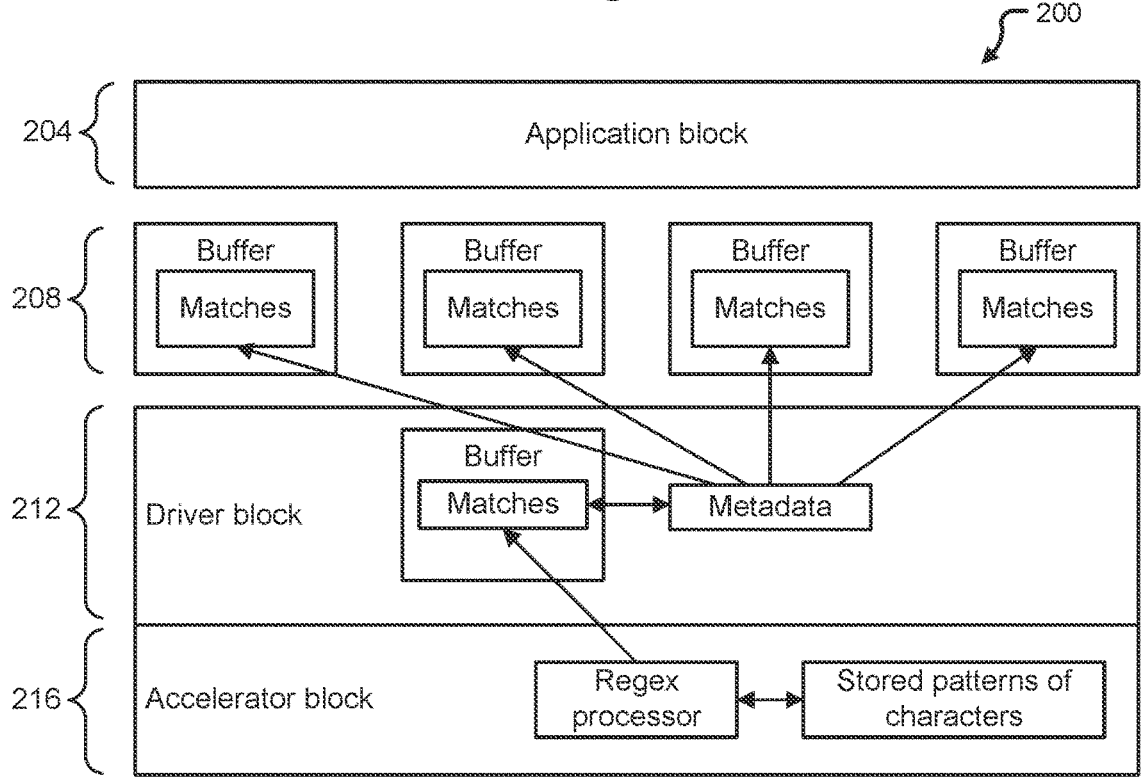

FIGS. 2A and 2B are block diagrams illustrating an example structure 200 that may be included in the processing circuitry 116 and 120 in FIG. 1. More specifically, FIG. 2A relates to batching multiple data chunks into a single, larger, data chunk for regex processing while FIG. 2B relates to validating and invalidating potential pattern matches and returning matches to a respective source buffer.

As shown, the structure 200 for processing circuitry 116 and/or 120 may include various processing blocks 204, 208, 212, and 216. Processing block 204 may correspond to an application block, processing block 208 may correspond to a buffer block underlying the application block 204, processing block 212 may correspond to a driver block underlying the buffer block 208, and processing block 216 may correspond to an accelerator block 216 underlying the driver block. Each processing block 204, 208, 212, and 216 may include or rely on software and/or hardware for processing and/or storing data. Although processing blocks 204, 208, 212, and 216 are illustrated as being separate from one another, it should be appreciated that this is for the sake of explanation and not necessarily indicative of a physical structure. In one non-limiting embodiment, the structure 200 is incorporated with one or more other components of the processing circuitry 116 and/or 120.

In at least one embodiment, the application block 204 includes software and/or hardware for running one or more applications that manage regex processing and/or that test regex processing capabilities of the accelerator block 216 using data chunks from the buffer block 208. The buffer block 208 may correspond to one or more storage devices (e.g., volatile, nonvolatile, RAM, EEPROM, and/or the like) of a network device 104 and 112 that contain buffers for storing data chunks destined for regex processing. In at least one embodiment, the application block 204 provides the data chunks to the buffer block 208.

The driver block 212 may correspond to software (e.g., driver software) and/or hardware that is modified or modifiable to batch multiple data chunks from the buffers in buffer block 208 into a single larger, composite data chunk in buffer memory for the driver block 212. FIG. 2A illustrates the driver block 212 receiving multiple smaller data chunks from the buffer block 208 to form a composite data chunk that includes all of the smaller data chunks and that is passed to the accelerator block 216. As discussed in more detail below, the driver block 212 assigns metadata to the composite data chunk based configuration information of the data chunks from buffer block 208. The configuration information may include information regarding sizes or lengths of the data chunks from buffer block 208.

As may be appreciated, FIGS. 2A and 2B illustrate generic implementations for the various blocks 204, 208, 212, and 216. More or fewer buffers may be included in the buffer block 208 and driver block 212. One specific but non-limiting example of the driver block 212 includes a DPDK driver that is configured for or modified to enable formation of composite data chunks and assignment of metadata to the composite data chunks in accordance with example embodiments. In addition, one specific but non-limiting example of the application block 204 includes a proprietary benchmarking tool such as RXPBench and associated compiler such as RXPCompiler (RXPC). However, example embodiments are not limited thereto and the application block 204 may include one or more applications running on one or more network devices like network devices 104/112.

The accelerator block 216 may include a regex processor that corresponds to software and/or hardware that processes composite data chunks received from the driver block 212 to return a set of possible regex matches within the composite data chunks. As shown, the regex processor of the accelerator block 216 may be in communication with a library of stored patterns of characters stored, for example, on memory associated with the accelerator block 216. In one specific but non-limiting example, the stored patterns of characters include one or more regular expressions with suitable syntax. The regex processor may process the composite data chunk received from driver block 212 to identify matches between one or more patterns of characters within the composite data chunk and the patterns of characters stored in the library.

FIG. 2B illustrates the regex processor of the accelerator block 216 returning potential matches between one or more patterns of characters within composite data chunk and one or more stored regex patterns of characters to a buffer of the driver block 212. Thereafter, the driver block 212 may invalidate and/or validate the potential matches based on, for example, the metadata assigned to the composite data chunk and/or based on anchoring information. The potential regex matches should undergo the validation process because the accelerator block 216 is "blind" to the fact that the regex processor is processing multiple data chunks as one composite data chunk. That is, the accelerator block 216 is isolated from the metadata generated by the driver block 212 as well as the configuration information included with data chunks from buffer block 208. As may be appreciated, the regex processor of the accelerator block 216 may, in some cases, return false matches to the driver block 212. A false match may be a match between a stored pattern of characters and a pattern of characters within the composite data chunk that spans a boundary between two of the smaller data chunks. At the validation stage, the driver block 212 in FIG. 2B may additionally or alternatively consult anchoring information that identifies a condition that governs where a match must appear within one of the smaller data chunks as sent by the buffer block 208. This anchoring information may be associated with regex patterns of characters that the regex processor attempts to match to within the composite data chunk. The driver block 212 may use knowledge of the offsets between the smaller data chunks within the composite data chunk and any relevant anchoring information to validate a potential match.

Here, it should be appreciated that a pattern of characters, as used herein, may comprise any suitable string of characters. For example, the data chunks from buffer block 208 and the composite data chunk formed by driver block 212 may comprise any suitable string of characters (e.g., ASCII, hex, and/or the like) having a length or size that is less than or equal to a maximum size of a composite data chunk. In at least one example embodiment, the driver block 212 may also implement a minimum size for a composite data chunk so that processing resources are not wasted by processing composite data chunks that are below a threshold minimum size. The maximum and/or minimum size of the composite data chunk may be determined based on the processing capabilities of the regex processor and/or based on knowledge regarding the processing efficiency of the regex processor for data chunks of a particular size. In other words, the maximum and/or minimum size of the composite data chunk may straddle a "sweet spot" where processing efficiency is improved compared to the processing efficiency when processing composite data chunks under the minimum size and over the maximum size.

Meanwhile, as noted above, the patterns of characters stored in accelerator block 216 may correspond to regular expressions, which may be generally defined as a series or sequence of characters that defines a search pattern according to a suitable syntax (e.g., a search pattern is a pattern to be searched for in the composite data chunk). The above and below described anchoring information may be "encoded" into a rule ID of a regular expression and returned by the regex processor to the driver block 212 to indicate where a match is valid in a data chunk from buffer block 208. Specific, non-limiting, examples for matching regular expressions with and without anchoring information and for encoding anchoring information into a rule ID are provided below.

As an example, suppose a first data chunk from a buffer in the buffer block 208 contains characters "ABCDEF" while a second data chunk from another buffer in the buffer block 208 contains characters "GHIJKL." The driver block 212 in FIG. 2A may take these two data chunks and form a composite data chunk "ABCDEFGHIJKL." In accordance with example embodiments, the driver block 212 assigns and stores metadata about the composite data chunk to indicate that the composite data chunk is comprised of two smaller data chunks of length 6 bytes/characters each. The metadata may include offset information that identifies where the first data chunk and the second data chunk are located within the composite data chunk. The offset information may be indicative of a length of each data chunk in the composite data chunk.

The metadata may further include a unique identifier that is assigned to the composite data chunk that enables driver block 212 and/or the accelerator block 216 to distinguish the composite data chunk from other composite data chunks. The unique identifier may be a universally unique identifier (UUID) generated by a random number generator. In at least one embodiment, the unique identifier may be determined by the driver block 212 based on the data chunks from buffer block 208. The driver block 212 may send the composite data chunk and its ID to the accelerator block 216 for the accelerator block 216 to then send the composite data chunk's ID and regex matches back to the driver block 216 after processing the composite data chunk for matches. In at least one embodiment, the ID of the composite data chunk is set to the memory location of the metadata associated with that composite data chunk—this way, when the accelerator block 216 returns the matches for that composite data chunk, the driver block 212 need not perform a lookup and can simply access the metadata using the returned ID.

The metadata at the driver block 212 may further include unique identifiers of each data chunk in the composite data chunk to enable easy reference to the data chunk. The driver block 212 may send a unique identifier of an individual data chunk back to the buffer block 208 and/or the application block 204 along with the results (e.g., matches) for a particular job so that the buffer block 208 and/or the application block 204 knows which job the results belong to while remaining blind to the batching of data chunks performed at the driver block 212. The unique identifiers may be assigned to each data chunk in the composite data chunk at, for example, the application block 204 and then passed to the driver block 212 via the buffer block 208. The unique identifiers of individual data chunks from buffer block 208 may be assigned in the same or similar manner as that described above for a unique identifier of a composite data chunk (i.e., a UUID generated by a random number generator and/or the like). By way of example, if an application of the application block 204 sends two data chunks with IDs 1 and 2 to the driver block 212 for regex processing, the driver block 212 may store the data chunk IDs 1 and 2 (the driver block 212 may also assign an identifier to the composite data chunk formed from the two data chunks and store the identifier of the composite data chunk as metadata). The application block 204 receives a response for each data chunk and expects to also receive the ID of the data chunk as sent to the driver block 212, where such response may indicate that there are N matches in the data chunk with ID 1 and M matches in the data chunk with ID 2. Accordingly, the driver block 212 stores the original chunk IDs as received from application block 204 via the buffer block 208 (IDs 1 and 2 in this specific example) as metadata so that the IDs can be passed back to the application along with the matches for those data chunks.

In any event unique IDs for the composite data chunk and/or for the smaller data chunks that makeup the composite data chunk may be reused upon completion of the regex matching process. For example, unique IDs may be made available for reuse once the driver block 212 returns matches from the accelerator block 216 to the buffer block 208 and/or the application block 204.

Returning to the above example in which a composite data chunk is "ABCDEFGHIJKL", the system may then desire to match a third pattern against the first and second data chunks to determine whether the third pattern of characters occurs in either of the first and second data chunks. This third pattern of characters may correspond to a regular expression from the stored patterns of characters in accelerator block 216. For this example, assume the third pattern of characters is "HI.K", which is not ASCII text like the first and second data chunks, but a regular expression with special syntax. In this case, the "." (dot) in "HI.K" means 'match any character' between I and K. That is to say, the regex processor searches the composite data chunk for four characters in a row beginning with "HI" and ending in "K" with any one character (regardless of the character's value) located in between. The regex processor attempts to match the third pattern of characters (which is a regular expression) against the composite data chunk and outputs a match as HIJK=HI.K. The regex processor returns the match to the driver block 212 along with information that a match of length 4 (i.e., four characters HIJK) has been found within the composite data chunk at an offset of 7 characters from the beginning of the composite data chunk (i.e., 7 characters from A). The driver block 212 may then compare this offset and length with the stored metadata and verify that this match exists entirely within the second data chunk and is therefore a valid match for the second data chunk. The third pattern of characters may take on any suitable syntax for regex matching. Notably, if a "." existed in the first or second data chunks that are not regular expressions, this would mean a full stop/period.

Now, suppose the same third pattern of characters or regular expression "HI.K" is anchored, which may mean that a valid match must be at the beginning (or end) of the first data chunk and/or the second data chunk (e.g., "^HI.K" means that "HI.K" is anchored and must appear at the beginning of a data chunk). The regex processor informs the driver block 212 that there is a match at an offset of 7 and of length 4, and further informs the driver block 212 that the regular expression is anchored. For example, the regex processor returns a rule ID of the regular expression and the driver block 212 matches the rule ID to a particular regular expression to determine that the regular expression is anchored. Using the metadata assigned to the composite chunk by the driver block 212 prior to regex processing, it is known that the second data chunk starts at an offset of 6 characters from the first character "A" in the composite data chunk "ABCDEFGHIJKL". Because the match has an offset of 7, the match is not at the start of the second data chunk "GHIJKL" and is therefore an invalid match. An invalid match may be discarded. For example, the invalid matches are not returned to the buffer block 208 and may be deleted from memory of the driver block 212.

In view of the above, it should be appreciated that the anchoring information of a regular expression (third pattern of characters) indicates where the matched characters should be positioned in the first/second data chunk (or within other data chunks in a composite data chunk). This information can then be combined with the stored offset information in the driver block 212 to validate matches.

The same process explained above involving anchoring information may be used to signal if matching should take place at a given offset within a data chunk or at the end of a data chunk.

The anchoring information may be encoded into the regular expression's rule ID in accordance with the following discussion. Each regular expression stored in the accelerator block 216 has a unique ID that is returned with a match so that the driver block 212 knows which regular expression has matched (the driver block 212 may have rule IDs paired with regular expressions stored in memory to consult upon receiving a rule ID from the accelerator block 216). By way of example and in a scenario without batching data chunks according to inventive concepts, assume that 21 total bits (e.g., bits 0 to 20) are reserved for rule IDs of regular expressions. Further assume that a particular regular expression with rule ID 2 is anchored (e.g., such that the match for the regular expression must appear at the start of a data chunk) and that the accelerator block 216 finds a match in data chunk A. In this case, the driver block 212 receives a message indicating that a regular expression with rule ID 2 was matched in data chunk A. However, when combining data chunks into a composite data chunk as in example embodiments at the driver block 212, the accelerator block 216 only finds the match for data chunk A if data chunk A is the first data chunk in the composite data chunk; else the match is not found because the accelerator block 216 does not know that smaller data chunks have been combined (i.e., the accelerator block 216 treats the composite data chunk as a single data chunk, not a collection of smaller data chunks).

Example embodiments propose to address the above issue by instructing the rules compiler at the driver block 212 to remove the anchoring information from rule ID 2 (meaning that the regular expression can now match anywhere in a composite data chunk, not just the start of the composite data chunk). Example embodiments further propose to "encode" the anchoring information into the rule ID using some of the bits reserved for the rule ID. Stated another way, the rule ID for a particular regular expression is modified at the compiler to later indicate to the driver block 212 that the regular expression is anchored.

By way of example, again assume that 21 total bits (bit 0 to bit 20) within the complier at the driver block 212 are reserved for rule IDs and that an anchored regular expression with rule ID 2 is processed by accelerator block 216. According to at least one embodiment, the driver block 212 instructs the compiler to change one or more of the upper (or more) significant bits of the set of bits reserved for rule IDs to indicate that the regular expression is anchored. For example, an initial rule ID 2 of the regular expression may be altered to rule ID 1,048,578 by changing the most significant bit of rule ID 2. In this scenario, rule ID 2 is represented with 21 total binary bits as 19 zeroes followed by '10' (corresponding to decimal number 2) while rule ID 1,048,578 is represented with 21 total binary bits as a '1' followed by 18 zeros which is followed by '10' (corresponding to decimal number 1,048,578). Rule ID 1,048,578 corresponds to rule ID 2 in that the binary representation of decimal number 1,048,578 is the binary representation of decimal number 2 (rule ID 2) with bit 20 (the most significant bit) set to 1 instead of 0. As may be appreciated, bit 20 indicates that the regular expression is anchored and the lower 20 bits give the initial rule ID.

Once the anchoring information is encoded into rule ID 2 as described above, the accelerator block 216 finds the match for the regular expression with rule ID 2 wherever the match exists in the composite data chunk and informs the driver block 212 to look for a match of a regular expression with rule ID 1,048,578. Because the accelerator block 216 is blind to the anchoring information encoded in the rule ID and metadata in driver block 212, the accelerator block 216 returns any matches with the same rule ID provided by the driver block 212, in this case, rule ID 1,048,578. The driver block 212, however, knows that bit 20 was modified in the initial rule ID 2 by the compiler and performs suitable post-processing to ensure that the match returned by the accelerator block 216 adheres to the anchoring requirements of the regular expression with rule ID 2 (e.g., that the match is at the start of a data chunk in the composite data chunk) and not a regular expression with rule ID 1,048,578. If the driver block 212 validates the match for the regular expression with rule ID 2, then the driver block 212 passes the validated match back to buffer block 208 to inform an application that the appropriate data chunk(s) within the composite data chunk contains a valid match for the regular expression with rule ID 2.

The above described example for encoding anchoring information into rule IDs of regular expressions does so by modifying a most significant bit of a rule ID. However, example embodiments are not limited thereto, and one or more other bits of a rule ID may be additionally or alternatively modified at the compiler to achieve the same or similar result so long as the driver block 212 tracks which bits have been modified. In addition, the rule IDs noted above are discussed with reference to binary and decimal values, but example embodiments may employ any suitable numeral system (e.g., hexadecimal values, octal values, etc.).

Figure 3:
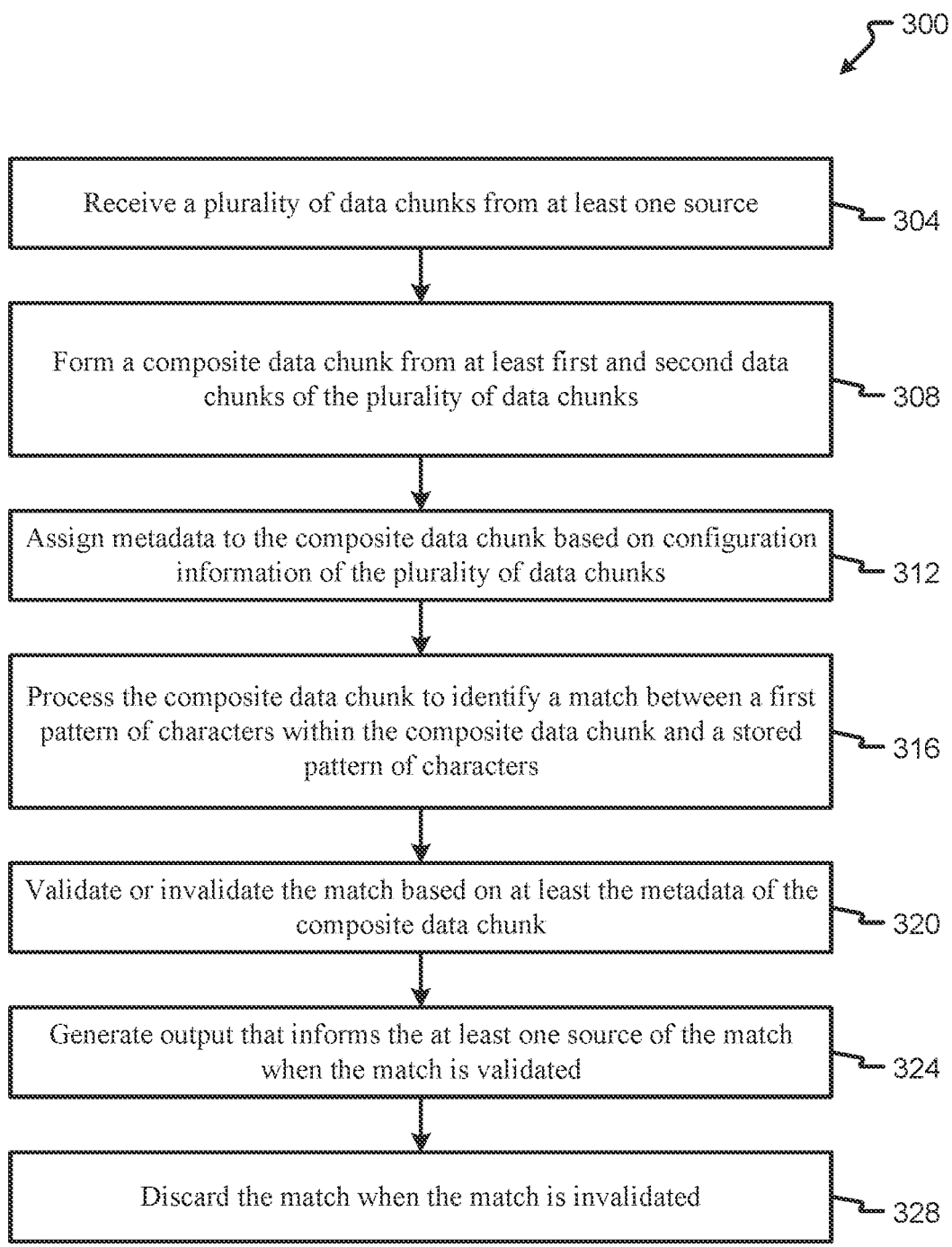
FIG. 3 illustrates a method according to at least one example embodiment.

FIG. 3 illustrates a method 300 according to at least one example embodiment. While a general order for the steps of the method 300 is shown in FIG. 3, the method 300 can include more or fewer steps or can arrange the order of the steps differently than those shown in FIG. 3. The method 300 can be executed as a set of computer-executable instructions encoded or stored on a computer readable medium and/or executed by processing circuitry 116 and/or 120 having a structure 200. Hereinafter, the method 300 shall be explained with reference to the systems, components, assemblies, devices, user interfaces, environments, software, etc. described in conjunction with FIGS. 1-2B.

Operation 304 includes receiving a plurality of data chunks from at least one source. The at least one source may correspond to one or more buffers in buffer block 208. In at least one example embodiment, one or more applications in application block 204 provide the data chunks to the buffer block, where the one or more applications are running on a host server or other computing device coupled to or integrated with a network device 104 and/or 112.

Operation 304 includes forming a composite data chunk from at least first and second data chunks of the plurality of data chunks. For example, driver block 212 forms the composite data chunk by serializing the plurality of data chunks received in operation 304. As noted here, the sizes of the data chunks in buffer block 208 may be the same or different depending on design preferences. Similarly, the size of each composite data chunk formed by the driver block 212 may be the same or different depending on design preferences. In at least one embodiment, the driver block 212 fetches data chunks from the buffer block 208 until the size of a resulting composite data chunk reaches a threshold size, which may be a design parameter set based on empirical evidence and/or preference (e.g., set based on known or estimated processing efficiencies of the accelerator block 216). Additionally or alternatively, the driver block 212 may query the buffer block 208 to search for specifically sized data chunks (of same or different sizes) whose sizes add up to the threshold size or to a size near the threshold size. This may enable the system to process like-sized composite data chunks for the purpose of ensuring relatively constant processing and/or memory resource usage.

Operation 312 includes assigning metadata to the composite data chunk based on configuration information of the plurality of data chunks. In one example, the configuration information indicates a size or length of each data chunk in the plurality of data chunks. The metadata may include offset information that identifies where the first data chunk and the second data chunk are located within the composite data chunk. In an example, the offset information may be indicative of a length of each data chunk in the composite data chunk. The offset information may be used to identify boundaries of each data chunk in the composite data chunk. With reference to the example set forth above where a composite data chunk "ABCDEFGHIJKL" is formed of two smaller data chunks "ABCDEF" and "GHIJKL", the offset information for data chunk "ABCDEF" may indicate offsets of 1 and 6 within the composite data chunk because, from left-to-right, this smaller data chunk occupies the first six characters of the composite data chunk. Meanwhile, the offset information for data chunk "GHIJKL" may indicate offsets of 7 and 12 because, from left-to-right, this smaller data chunk occupies the next six characters of the composite data chunk. In view of the above, it may be said that the boundaries of the each data chunk are defined the offsets for each data chunk.

The metadata assigned in operation 312 may further include a unique identifier that is assigned to the composite data chunk that enables driver block 212 and/or the accelerator block 216 to distinguish the composite data chunk from other composite data chunks.

Operation 316 includes processing the composite data chunk to identify a match between a first pattern of characters within the composite data chunk and a stored pattern of characters. In accordance with example embodiments, the stored pattern of characters may correspond to one or more regular expressions stored in a library accessible by the regex processor of accelerator block 216. The regex processor may interpret the syntax of a regular expression and attempt to find a match (as the first pattern of characters) in the composite data chunk.

Operation 320 includes validating or invalidating the match based on at least the metadata of the composite data chunk assigned in operation 312. For example, the driver block 212 may be configured to validate the match between the first pattern of characters and the stored pattern of characters when the offset information indicates that the first pattern of characters falls within boundaries of the first data chunk or within boundaries of the second data chunk. In at least one example, the driver block 212 is configured to invalidate the match between the first pattern of characters and the stored pattern of characters when the offset information indicates that the first pattern of characters overlaps a boundary between the first data chunk and the second data chunk. For example, if a matched pattern of characters begins at offset 7 within the composite data chunk and ends at offset 13 but the boundary between two data chunks is between offset 10 and 11 of the composite data chunk, then the match is invalidated for overlapping the boundary between two data chunks.

In at least one example embodiment, the match is additionally or alternatively validated or invalidated by the driver block 212 based on anchoring information from the accelerator block 216 (if such anchoring information exists and is returned with the match). The anchoring information may identify a condition governing where the matched first pattern of characters should appear within the first data chunk and the second data chunk. Here, the driver block 212 may validate the match between the first pattern of characters and the stored pattern of characters when the condition is satisfied. On the other hand, the match between the first pattern of characters and the stored pattern of characters may be invalidated when the condition is violated. For example, if anchoring information indicates that a matched pattern should be at the beginning of data chunks within the composite data chunk, but the offset information indicates that the matched pattern is not at the beginning of any data chunks within the composite data chunk, then the match is invalidated. However, the match is validated if the matched pattern of characters is determined to be at beginning of any data chunk in the composite data chunk.

Operation 324 includes generating output that informs the at least one source of the match when the match is validated. For example, as shown in FIG. 2B, matches or notification of matches are returned to the buffer block 208, which may in turn inform the application block 204 of any matches to trigger further processing involving the match (e.g., further by an application of the application block 204 or other externally run application).

Operation 328 includes discarding the match when the match is invalidated. For example, when the match is not valid, the driver block 212 deletes the invalid match from memory without returning the match or a notification of the match to the buffer block 208 and/or the application block 204. In at least one embodiment, operation 328 includes informing the buffer block 208 and/or the application 204 that a match was not found for a particular data chunk.

In view of the above, it should be appreciated that a network device 104 and/or 112 may include a first processing block configured to form a composite data chunk from a plurality of data chunks and assign metadata to the composite data chunk based on configuration information associated with the plurality of data chunks. The first processing block may correspond to driver block 212 while the plurality of data chunks originate from buffer block 208. In accordance with example embodiments, the configuration information may include information about sizes of the plurality of data chunks so that the metadata contains offset information about where a particular data chunk is located in a composite data chunk. The network device may further include a second processing block that is isolated from the configuration information and the metadata and configured to process the composite data chunk to identify a match between a first pattern of characters within the composite data chunk and a stored pattern of characters. The second processing block may correspond to accelerator block 216 that is "blind" to or isolated from the configuration information and the metadata generated by the first processing block 212. The second processing block 216 includes the regex processor that compares the composite data chunk to the stored pattern of characters to determine whether the composite data chunk contains the first pattern of characters that matches the stored pattern of characters. As noted above, the stored pattern of characters may include one or more regular expressions having suitable syntax.

In at least one embodiment, the first processing block 212 is configured to validate or invalidate the match identified by the second processing block 216 based on the metadata stored at the first processing block 212. Additionally or alternatively, the first processing block 212 is configured to validate or invalidate the match identified by the second processing block 216 further based on anchoring information that identifies where the matched first pattern of characters should appear within one of the plurality of data chunks.

In view of the above, it should be appreciated that example embodiments provide methods and devices for offloaded regular expression processing with improved speed and/or reduced power consumption compared to related art techniques that do not batch multiple data chunks into a composite data chunk for the purpose of regex matching.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured as follows:

(1) 1. A network device, comprising:
 processing circuitry configured to:
  receive a plurality of data chunks from at least one source;
  form a composite data chunk from at least first and second data chunks of the plurality of data chunks;
  process the composite data chunk to identify a match between a first pattern of characters within the composite data chunk and a stored pattern of characters; and
  validate or invalidate the match based on metadata of the composite data chunk.

(2) The network device of (1), wherein the processing circuitry is configured to:
 assign the metadata to the composite data chunk;
 generate output that informs the at least one source of the match when the match is validated; and
 discard the match when the match is invalidated.

(3) The network device of one or more of (1) to (2), wherein the metadata includes offset information that identifies where the first data chunk and the second data chunk are located within the composite data chunk.

(4) The network device of one or more of (1) to (3), wherein the processing circuitry is configured to validate the match between the first pattern of characters and the stored pattern of characters when the offset information indicates that the first pattern of characters falls within boundaries of the first data chunk or boundaries of the second data chunk.

(5) The network device of one or more of (1) to (4), wherein the processing circuitry is configured to invalidate the match between the first pattern of characters and the stored pattern of characters when the offset information indicates that the first pattern of characters overlaps a boundary between the first data chunk and the second data chunk.

(6) The network device of one or more of (1) to (5), wherein the processing circuitry is configured to validate or invalidate the match further based on anchoring information that identifies a condition governing where the matched first pattern of characters should appear within the first data chunk and the second data chunk.

(7) The network device of one or more of (1) to (6), wherein the processing circuitry is configured to validate the match between the first pattern of characters and the stored pattern of characters when the condition is satisfied.

(8) The network device of one or more of (1) to (7), wherein the processing circuitry is configured to invalidate the match between the first pattern of characters and the stored pattern of characters when the condition is violated.

(9) The network device of one or more of (1) to (8), wherein the metadata includes a unique identifier that is assigned to the composite data chunk that enables the processing circuitry to distinguish the composite data chunk from other composite data chunks.

(10) The network device of one or more of (1) to (9), wherein the at least one source comprises a plurality of sources.

(11) The network device of one or more of (1) to (10), wherein the plurality of sources correspond to applications running on the network device.

(12) The network device of one or more of (1) to (11), wherein the stored pattern of characters corresponds to a regular expression.

(13) A system comprising:
at least one network device that runs one or more applications;
processing circuitry coupled to the at least one network device, the processing circuitry being configured to:
receive a plurality of data chunks from the one or more applications;
form a composite data chunk from at least first and second data chunks of the plurality of data chunks;
process the composite data chunk to identify a match between a first pattern of characters within the composite data chunk and a stored pattern of characters, the stored pattern of characters corresponding to a regular expression;
validate or invalidate the match based on metadata of the composite data chunk;
generate output that informs the one or more applications of the match when the match is validated; and
discard the match when the match is invalidated.

(14) The system of (13), wherein the metadata includes offset information that identifies where the first data chunk and the second data chunk are located within the composite data chunk, and wherein the match is validated or invalidated based on the offset information and anchoring information that identifies a condition governing where the match should appear within the first data chunk and the second data chunk.

(15) The system of one or more of (13) to (14), wherein the processing circuitry is configured to validate or invalidate the match based on at least one of: i) boundaries of the first data chunk and the second data chunk as indicated by the offset information; or ii) whether or not the condition is satisfied.

(16) The system of one or more of (13) to (15), wherein the metadata includes a unique identifier that is assigned to the composite data chunk that enables the processing circuitry to distinguish the composite data chunk from other composite data chunks.

(17) A network device, comprising:
a first processing block configured to form a composite data chunk from a plurality of data chunks and assign metadata to the composite data chunk based on configuration information associated with the plurality of data chunks; and
a second processing block that is isolated from the configuration information and the metadata, the second processing block being configured to process the composite data chunk to identify a match between a first pattern of characters within the composite data chunk and a stored pattern of characters.

(18) The network device of (17), wherein the configuration information includes information about sizes of the plurality of data chunks.

(19) The network device of one or more of (17) to (18), wherein the first processing block is configured to validate or invalidate the match identified by the second processing block based on the metadata.

(20) The network device of one or more of (17) to (19), wherein the first processing block is configured to validate or invalidate the match identified by the second processing block further based on anchoring information that identifies a condition governing where the matched first pattern of characters should appear within each of the plurality of data chunks.

What is claimed is:

1. A network device, comprising:
processing circuitry configured to:
receive a plurality of data chunks from at least one source;
form a composite data chunk from at least first and second data chunks of the plurality of data chunks;
process the composite data chunk to identify a match between a first pattern of characters within the composite data chunk and a stored pattern of characters; and
validate or invalidate the match based on metadata of the composite data chunk, wherein the processing circuitry comprises an integrated circuit.

2. The network device of claim 1, wherein the processing circuitry is configured to:
assign the metadata to the composite data chunk;
generate output that informs the at least one source of the match when the match is validated; and
discard the match when the match is invalidated.

3. The network device of claim 1, wherein the metadata includes offset information that identifies where the first data chunk and the second data chunk are located within the composite data chunk.

4. The network device of claim 3, wherein the processing circuitry is configured to validate the match between the first pattern of characters and the stored pattern of characters when the offset information indicates that the first pattern of characters falls within boundaries of the first data chunk or boundaries of the second data chunk.

5. The network device of claim 4, wherein the processing circuitry is configured to invalidate the match between the first pattern of characters and the stored pattern of characters when the offset information indicates that the first pattern of characters overlaps a boundary between the first data chunk and the second data chunk.

6. The network device of claim 1, wherein the processing circuitry is configured to validate or invalidate the match further based on anchoring information that identifies a condition governing where the matched first pattern of characters should appear within the first data chunk and the second data chunk.

7. The network device of claim 6, wherein the processing circuitry is configured to validate the match between the first pattern of characters and the stored pattern of characters when the condition is satisfied.

8. The network device of claim 7, wherein the processing circuitry is configured to invalidate the match between the first pattern of characters and the stored pattern of characters when the condition is violated.

9. The network device of claim 1, wherein the metadata includes a unique identifier that is assigned to the composite data chunk that enables the processing circuitry to distinguish the composite data chunk from other composite data chunks.

10. The network device of claim 1, wherein the at least one source comprises a plurality of sources.

11. The network device of claim 10, wherein the plurality of sources correspond to applications running on the network device.

12. The network device of claim 1, wherein the stored pattern of characters corresponds to a regular expression.

13. A system comprising:
at least one network device that runs one or more applications;
processing circuitry coupled to the at least one network device, the processing circuitry being configured to:
receive a plurality of data chunks from the one or more applications;
form a composite data chunk from at least first and second data chunks of the plurality of data chunks;
process the composite data chunk to identify a match between a first pattern of characters within the composite data chunk and a stored pattern of characters, the stored pattern of characters corresponding to a regular expression;
validate or invalidate the match based on metadata of the composite data chunk;
generate output that informs the one or more applications of the match when the match is validated; and
discard the match when the match is invalidated, wherein the processing circuitry comprises an integrated circuit.

14. The system of claim 13, wherein the metadata includes offset information that identifies where the first data chunk and the second data chunk are located within the composite data chunk, and wherein the match is validated or invalidated based on the offset information and anchoring information that identifies a condition governing where the match should appear within the first data chunk and the second data chunk.

15. The system of claim 14, wherein the processing circuitry is configured to validate or invalidate the match based on at least one of: i) boundaries of the first data chunk and the second data chunk as indicated by the offset information; or ii) whether or not the condition is satisfied.

16. The system of claim 14, wherein the metadata includes a unique identifier that is assigned to the composite data chunk that enables the processing circuitry to distinguish the composite data chunk from other composite data chunks.

17. A network device, comprising:
a first processing block configured to form a composite data chunk from a plurality of data chunks and assign metadata to the composite data chunk based on configuration information associated with the plurality of data chunks; and
a second processing block that is isolated from the configuration information and the metadata, the second processing block being configured to process the composite data chunk to identify a match between a first pattern of characters within the composite data chunk and a stored pattern of characters, wherein the first processing block is configured to validate or invalidate the match identified by the second processing block based on the metadata, and wherein the first processing block and the second processing block comprise an integrated circuit.

18. The network device of claim 17, wherein the configuration information includes information about sizes of the plurality of data chunks.

19. The network device of claim 17, wherein the metadata includes offset information that identifies where each data chunk is located within the composite data chunk.

20. The network device of claim 17, wherein the first processing block is configured to validate or invalidate the match identified by the second processing block further based on anchoring information that identifies a condition governing where the matched first pattern of characters should appear within each of the plurality of data chunks.

* * * * *